United States Patent [19]
Friderich

[11] Patent Number: 5,013,235
[45] Date of Patent: May 7, 1991

[54] STACK INJECTION MOLDING MELT TRANSFER APPARATUS

[75] Inventor: Raimund Friderich, Sasbach, Fed. Rep. of Germany

[73] Assignee: Otto Männer, Bahlingen, Fed. Rep. of Germany

[21] Appl. No.: 431,472

[22] Filed: Nov. 1, 1989

[30] Foreign Application Priority Data

Dec. 21, 1988 [DE] Fed. Rep. of Germany ....... 3843037

[51] Int. Cl.$^5$ ......................................... B29C 45/22
[52] U.S. Cl. .................................. 425/564; 137/861; 137/869; 264/297.2; 264/328.8; 425/570; 425/572; 425/588
[58] Field of Search ............... 425/549, 562, 563, 564, 425/566, 568, 570, 572, 588, 565, 571; 264/297.2, 328.8, 328.9, 328.15; 137/861, 869

[56] References Cited

U.S. PATENT DOCUMENTS

| | | | |
|---|---|---|---|
| 3,037,245 | 6/1962 | Darnell | 425/562 |
| 4,212,626 | 7/1980 | Gellert | 425/572 |
| 4,662,837 | 5/1987 | Anderson | 425/566 |
| 4,832,593 | 5/1989 | Brown | 425/564 |

Primary Examiner—Timothy Heitbrink
Attorney, Agent, or Firm—Peter K. Kontler

[57] ABSTRACT

A stack molding apparatus wherein the injection nozzles are disposed in pairs of coaxial nozzles in a housing between two sets of injection molds. The reciprocable valving elements of the injection nozzles of each pair are coaxial with each other and are connected with pistons which are reciprocable by compressed air. The pistons are mounted in cylinders of discrete melt supplying members which receive melt from an additional melt supplying member. The housing has two mirror symmetrical sections which can be parted in a plane between pairs of coaxial pistons to afford access to the melt supplying members, to the pistons, to the nozzles and to a device which serves to supply compressed air for reciprocation of the pistons. The melt supplying members have melt conveying channels which register with each other in assembled condition of the housing sections, and the air supplying device has passages which can admit air directly between pairs of coaxial pistons or into the cylinders of the melt supplying members which carry the pistons and the associated nozzles.

13 Claims, 3 Drawing Sheets

STACK INJECTION MOLDING MELT TRANSFER APPARATUS

BACKGROUND OF THE INVENTION

The invention relates to apparatus for conveying melt (plastic material) from a plasticizer to injection molds. More particularly, the invention relates to improvements in so-called multiple-cavity stack molding apparatus wherein the means for conveying melt from the plasticizer comprises a plurality of injection nozzles or valves.

Apparatus of the above outlined character are used for simultaneous forming of plastic articles in several mold cavities. The injection nozzles are disposed between two sets of injection molds and are equipped with reciprocable needle-like valving elements (also called valve gate pins) which must be retracted in order to permit melt to issue from the orifices of the respective injection nozzles and extended in order to seal the respective orifices. The valving elements are reciprocable by pistons, and the apparatus further comprises a manifold which is provided with channels serving to supply melt to the nozzles. The manifold is heated, and the nozzles are installed in unheated platens of the manifold.

Certain heretofore known stack molding apparatus are designed in such a way that the injection nozzles for one set of molds are staggered with reference to injection nozzles for the other set of molds. This is necessary in order to take into consideration the length of valving elements and of the respective pistons as well as the dimensions of space which is available between the two sets of the injection molds. Attempts to assemble the injection nozzles into pairs of aligned nozzles include the provision of cylinder and piston drives which are adjacent the respective valving elements, and the utilization of levers for transmission of motion between the pistons and the valving elements. Neither of the just described conventional apparatus are entirely satisfactory for a number of reasons. Thus, the apparatus are bulky and comprise large numbers of parts. Moreover, the nozzles and the parts which are confined in the manifold are not readily accessible, and the assembly and dismantling times are too long. On the other hand, it is necessary to gain access to the injection nozzles and certain other parts at regular intervals in order to remove components which are subject to extensive wear, to repair the heating systems for the nozzles and/or for other reasons.

The aforediscussed proposal to employ pairs of aligned nozzles with their orifices facing in opposite directions is preferred at this time because the two sets of injection molds can be installed close to each other and the molds of one set can be mirror images of the molds of the other set. However, and since the cylinder and piston units which are used to reciprocate the valving elements of the injection nozzles must be placed next to the respective nozzles and must transmit motion by way of levers, the number of injection nozzles per unit area of the structure between the two sets of molds is relatively small. The number of injection nozzles per unit area of the structure between the two sets of molds is larger if the nozzles for one set of molds are staggered with reference to the nozzles for the other set of molds. However, this renders it necessary to employ two sets of different injection molds because the positions of inlets for admission of melt into the molds of one of the sets are different from the positions of inlets in the other set of molds. Moreover, neighboring nozzles must be maintained at a certain minimum distance from each other and each nozzle must extend across the full width of the structure between the two sets of molds.

OBJECTS OF THE INVENTION

An object of the invention is to provide an apparatus wherein a large number of nozzles can be assembled in a small area and wherein each nozzle for an injection mold of one set can be aligned with a nozzle for a mold of the other set without unduly increasing the distance between the two sets of molds.

Another object of the invention is to provide an apparatus wherein the nozzles can be operated without resorting to levers and wherein the distribution of nozzles for each set of molds can be the same as that of nozzles which are used in conjunction with a single set of injection molds.

A further object of the invention is to provide novel and improved means for supplying melt to the injection nozzles of the above outlined apparatus.

An additional object of the invention is to provide novel and improved means for supplying pressurized fluid to the pistons for the valving elements of injection nozzles in the above outlined apparatus.

Still another object of the invention is to provide a stack mold with a novel array of injection nozzles and with novel and improved means for supplying melt to the nozzles.

A further object of the invention is to provide a novel and improved method of reducing the space requirements of, and of affording access to, the injection nozzles and other parts of a stack mold.

SUMMARY OF THE INVENTION

The invention is embodied in a multiple-cavity stack molding apparatus which comprises a hollow housing disposed between at least two molds and having first and second sides, and first and second injection nozzles with melt-discharging orifices at the respective sides. Each orifice serves to admit melt into the cavity of a discrete mold. The nozzles further comprise valving elements for the orifices, and each such valving element is movable between extended and retracted positions to respectively seal and expose the respective orifice. The apparatus further comprises melt supplying means provided in the housing and including a discrete melt-conveying member for each orifice and an additional melt-conveying member having means for delivering melt to the discrete members. The means for moving the valving elements between extended and retracted positions includes reciprocable pistons which are installed in the melt supplying means.

The housing is preferably unheated, and the melt-supplying members are heated. Each piston is preferably coaxial with the respective valving element which latter can resemble or constitute an elongated needle.

The additional member of the melt-supplying means is movable with reference to the housing and with reference to the discrete members to and from an operative position. The melt delivering means of the additional member includes a channel having a plurality of discharge ends, one for each discrete member, and each discrete member has a melt-delivering channel including an intake end registering with one of the discharge ends in the operative position of the additional member.

The discrete members of the melt-supplying means include confronting first and second discrete members between the first and second sides of the housing, and the pistons include confronting coaxial first and second pistons between the first and second discrete members.

The housing preferably comprises two separable abutting unheated sections each of which has one of the aforementioned first and second sides, and the first and second discrete members are respectively installed in the first and second sections of the housing. Each section has a compartment for the respective discrete member, and each such discrete member is received with clearance in the respective compartment.

The peripheral surfaces of the pistons carry recessed piston rings. The arrangement is preferably such that each piston carries two or more split rings, and the abutting end portions of split rings on each of the pistons are offset relative to each other in the circumferential direction of the respective piston.

The two sections of the housing abut each other in a predetermined plane, preferably midway between the first and second sides, and the means for moving the valving elements further comprises a device for supplying a pressurized fluid (e.g., compressed air) to the pistons. Such device is preferably disposed between the two sections of the housing in, or at least in the region of, the predetermined plane. The fluid-supplying device and the members of the melt-supplying means are movable relative to the housing independently of each other. Each discrete member can be provided with at least one passage for delivery of pressurized fluid to the respective piston, and the fluid-supplying device has at least one additional passage with discharge ends which admit pressurized fluid to the passages of the discrete members. The discrete members can be provided with cylinder chambers for the respective pistons, and the passages of the discrete members then communicate with the respective cylinder chambers. The fluid-supplying device preferably extends between the pistons and includes at least one further passage for admission of pressurized fluid between the pistons.

The novel features which are considered as characteristic of the invention are set forth in particular in the appended claims. The improved apparatus itself, however, both as to its construction and the mode of assembling, dismantling and operating the same, together with additional features and advantages thereof, will be best understood upon perusal of the following detailed description of certain presently preferred specific embodiments with reference to the accompanying drawings.

DESCRIPTION OF PREFERRED EMBODIMENTS

Figure 1:
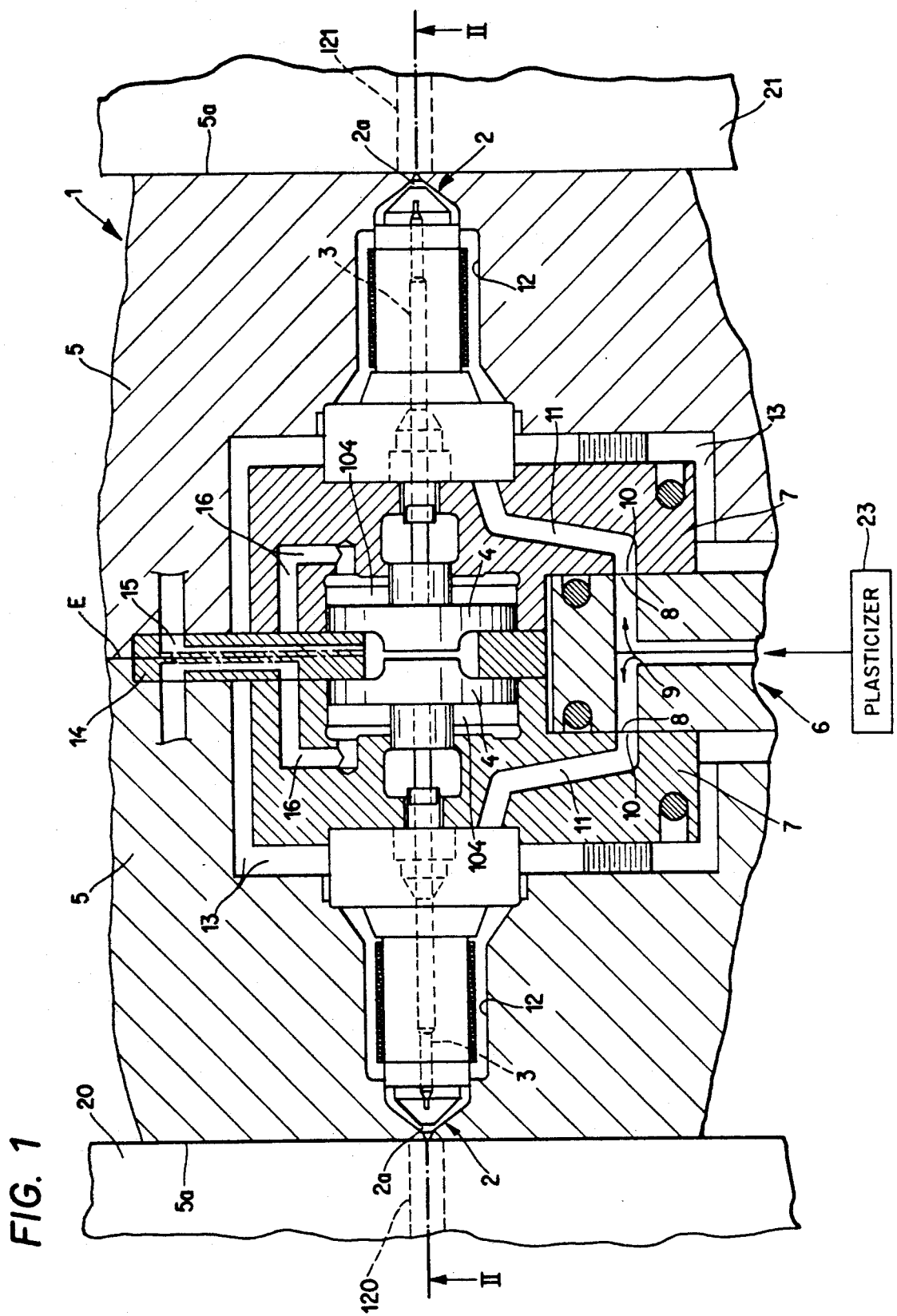
FIG. 1 is a fragmentary sectional view of an apparatus which embodies one form of the invention.
Figure 2:
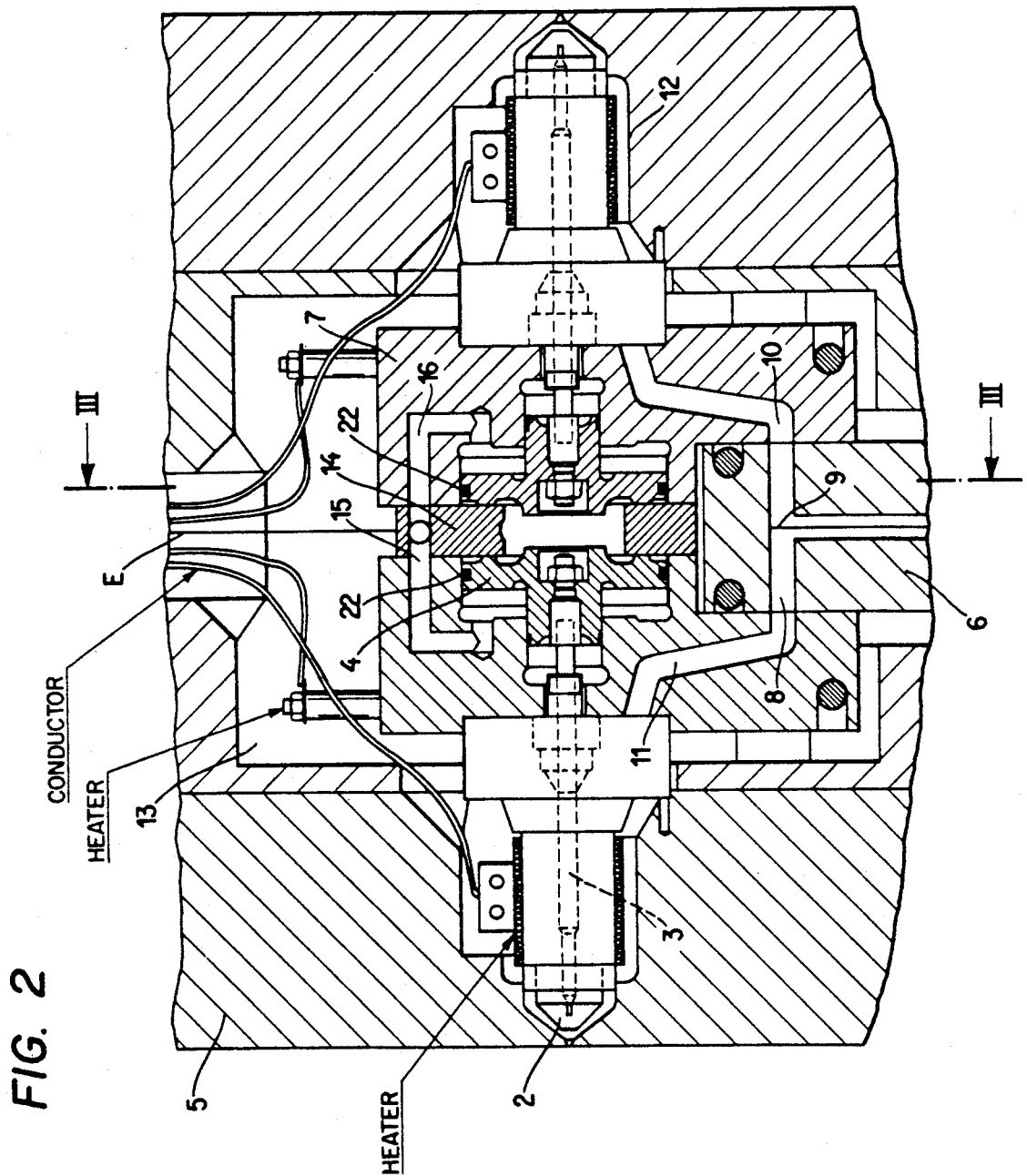
FIG. 2 is a sectional view substantially as seen in the direction of arrows from the line II—II of FIG. 1.
Figure 3:
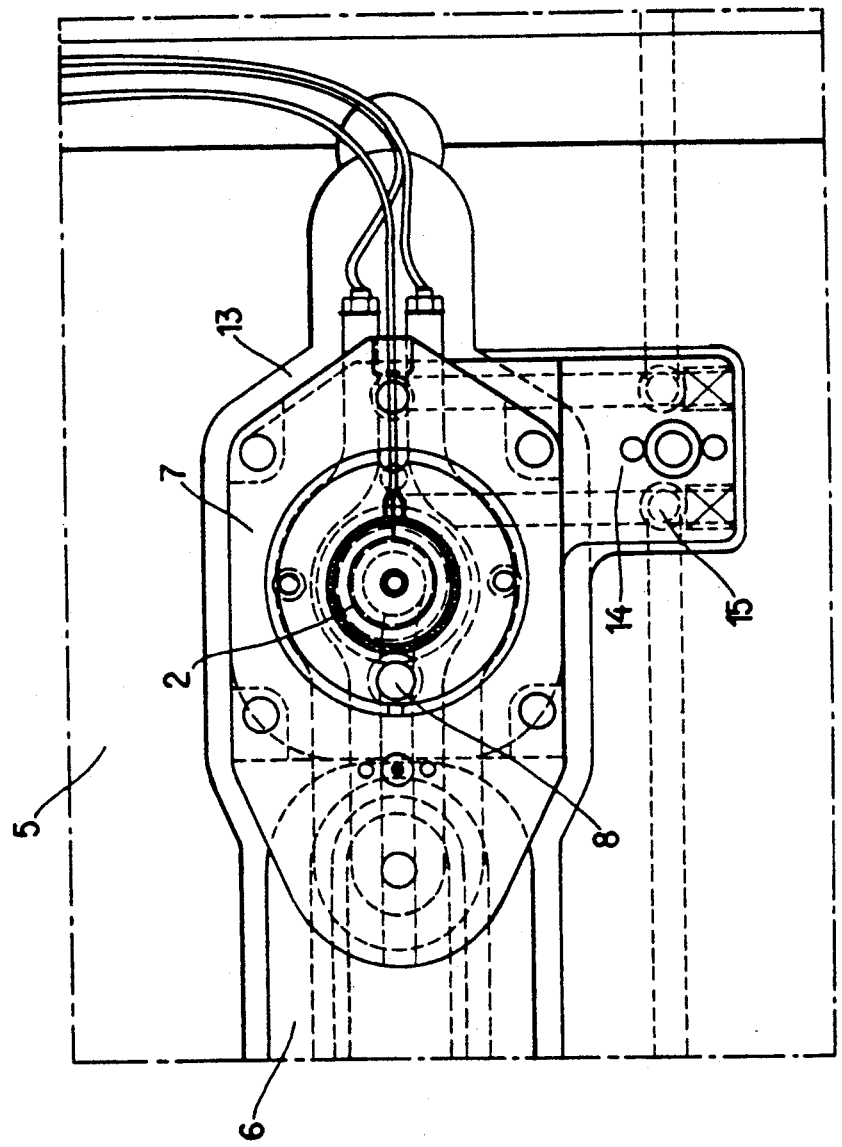
FIG. 3 is a sectional view substantially as seen in the direction of arrows from the line III—III of FIG. 2.

The apparatus 1 which is shown in FIGS. 1 to 3 is a multiple-cavity stack molding apparatus. This apparatus comprises a housing or manifold having two mirror symmetrical sections or halves 5 which abut each other in a plane E and are disposed between two sets of injection molds 20, 21 having cavities 120, 121. The sections 5 of the housing are not heated and can be said to form part of a module which further includes two coaxial injection nozzles or valves 2 having reciprocable needle-like valving elements 3 (also called valve gate pins), a composite melt supplying unit including two discrete melt supplying members 7 and an additional melt supplying member 6, and means (including pistons 4 in cylinders 104) for moving the valving elements 3 between extended positions (in which the respective orifices, 2a for admission of melt into the cavities 120, 121 of the molds 20, 21 are sealed) and retracted positions in which the melt is free to penetrate into the cavities of the respective molds. The orifice 2a of the right-hand nozzle 2 is located at the exposed (right-hand) side 5a of the right-hand housing section 5, and the orifice 2a of the left-hand nozzle 2 is located at the exposed (left-hand) side 5a of the left-hand housing section 5. The members 7, 6, 7 of the melt supplying unit are disposed between the sections 5 and are readily accessible when the sections 5 are moved apart. The apparatus 1 can comprise a substantial number of housings for pairs of coaxial nozzles 2, or a larger housing for several pairs of coaxial nozzles. The arrangement is such that the nozzles 2 for the molds of the set 20 inject melt simultaneously with nozzles 2 for the set 21 of injection molds.

Each discrete member 7 of the melt supplying unit which is shown in the drawing is installed in one of the sections 5, and the additional member 6 is disposed between the members 7 and serves to supply melt from a plasticizer 23 to the discrete members 7. To this end, the member 6 has a channel 9 with two discharge ends 8 in register with the receiving or intake ends 10 of channels 11 in the members 7. The channels 11 admit plasticizer to the respective nozzles 2, e g., in a manner as described and shown in commonly owned copending patent application Ser. No. 341,128 (now U.S. Pat. No. 4,925,384) filed Apr. 20, 1989 by Otto Männer for "Apparatus for admitting hardenable material into the dies of molding machines". The channels 9 and 11 establish uninterrupted paths for the flow of melt from the plasticizer 23 to the nozzles 2.

The pistons 4 are coaxial with and are connected to the rear or inner end portions of the respective valving elements 3. Each of these pistons is reciprocable in the cylinder 104 of the respective member 7 and can be moved between its two end positions (in which the corresponding orifices 2a are respectively sealed and exposed) by a pressurized fluid (such as compressed air) which is supplied by a fluid supplying device 14 between the sections 5 of the housing. The members 7, 6, 7 are heated in a manner not forming part of the invention but clearly shown in FIGS. 2 and 3.

The device 14 can be said to constitute or resemble a substantially plate-like distancing element which is insertable between the housing sections 5 and is provided with passages 15 for admission of pressurized fluid into the cylinders 104 by way of passages 16 in the members 7, or between the two illustrated pistons 4, depending upon whether the pistons 4 are called upon to retract the respective valving elements 3 or to move the valving elements to their extended positions. The device 14 is insertable between the sections 5 independently of the members 7, 6, 7 and vice versa. The arrangement is such that, as soon as the housing including the sections 5 is properly assembled with the members 7, 6, 7 of the melt supplying unit and with the fluid supplying device 14, the discharge ends 8 of the channel 9 are in proper alignment with the receiving ends 10 of the channels 11, and the passages 15 of the device 14 are ready to admit pressurized fluid to the cylinders 104 via passages 16 or into the space between the pistons 4. Since a substantial part of the device 14 is confined between the unheated sections 5 of the housing, the heated members 7 cannot overheat the fluid (normally air) which is supplied via passages 15 or 15, 16 to move the pistons 4 between their end positions.

FIGS. 2 and 3 show that the peripheral surface of each piston 4 has several circumferential grooves for piston rings 22 each of which is preferably a split ring. Each ring 22 is preferably designed to stand a temperature of at least 350° for extended intervals of time. The end portions of each split ring 22 are adjacent each other, and the end portions of the rings 22 on each of the pistons 4 are offset relative to each other in the circumferential direction of the respective piston. Such distribution of end portions of the split rings 22 (each piston 4 can be provided with more than two piston rings) is desirable in order to take into consideration the fact that the pistons 4 are reciprocable in heated members 7 of the melt supplying unit. The feature that each piston 4 is mounted in the cylinder 104 of a discrete member 7 contributes to compactness of the entire apparatus 1 and to convenience of assembling and dismantling the apparatus. Thus, the simple expedient of installing the pistons 4 for the valving elements 3 of the injection nozzles 2 directly in the heated members 7 of the melt supplying unit renders it possible to greatly reduce the overall dimensions of the apparatus 1, to place a large number of pairs of coaxial nozzles 2 close to each other, to reduce the distance between the two sets of injection molds 20, 21, and to ensure highly satisfactory delivery of melt to the nozzles. Subdivision of the melt supplying unit into a plurality of members renders it possible to gain access to the nozzles 2 and to various heating and other means without affecting the flow of melt toward and into the mold cavities.

The nozzles 2 for each of the two sets of injection molds 20, 21 can be placed as close to each other as in an apparatus which operates with a single set of injection molds.

An advantage of the improved apparatus is that the parts 7, 6, 7, 14 and 2 are readily accessible as soon as the sections 5 of the housing are parted in the plane E. This reduces the down times because a defective nozzle 2 can be reached, inspected and (if necessary) replaced within a short interval of time. The same holds true for access to the means for heating the nozzles 2 and to means for heating the members 7, 6, 7 of the melt supplying unit.

Another advantage of the improved apparatus is that the distance between the sides 5a of the sections 5 is surprisingly short in spite of the fact that pairs of pistons 4 are coaxial with each other. Each such piston 4 can be withdrawn from the respective housing section 5 together with the corresponding discrete melt supplying or delivering member 7 and with the respective nozzle 2. The members 7 are received, with a certain amount of play, in the compartments 13 of the respective sections 5, and such compartments have extensions 12 for the respective nozzles 2. The just discussed play is desirable in order to account for thermally induced expansion of the members 7 and of the respective nozzles as well as to provide adequate room for means which are used to heat the nozzles.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A multiple-cavity stack molding apparatus, comprising a hollow housing having opposed first and second sides; first and second injection nozzles respectively having first and second melt-discharging orifices or discharging melt into adjacent mold cavities, said first and second melt-discharging orifices located at said opposed first and second sides respectively and said first and second injection nozzles including first and second valving elements for said first and second melt-discharging orifices, respectively, said first and second valving elements being movable between extended and retracted positions to seal and expose the first and second orifices, respectively; melt supplying means provided in said housing for supplying melt to said first and second melt-discharging orifices, said melt supplying means including a separate discrete melt-conveying member for each of said nozzles and an additional melt-conveying member having means for delivering melt to said discrete melt-conveying members; and means for moving said first and second valving elements, said moving means including reciprocable first and second pistons provided in said melt supplying means for moving said first and second valving elements respectively, said first and second pistons, said first and second valving elements and said first and second injection nozzles positioned along a common axis.

2. The apparatus of claim 1, wherein said additional melt-conveying member is movable with reference to said discrete melt-conveying members to and from an operative position and said melt delivering means includes a channel with a plurality of discharge ends, one discharge end for each of said discrete melt-conveying members, said discrete melt-conveying members having melt-delivering channels having intake ends each of which registers with one of said discharge ends in an operative position of said additional melt-conveying member.

3. The apparatus of claim 2, wherein said discrete melt-conveying members comprise confronting first and second discrete melt-conveying members between said opposed first and second sides, said first and second pistons confronting each other between said first and second discrete melt-conveying members.

4. The apparatus of claim 3, wherein said housing comprises first and second separable abutting unheated sections each of which has one of said opposed sides, said first and second discrete melt-conveying members being provided in said first and second sections, respectively.

5. The apparatus of claim 4, wherein each of said first and second sections has a compartment for said first and second discrete melt-conveying members, respectively.

6. The apparatus of claim 5, wherein said first and second discrete melt-conveying members are received with clearance in the compartments of said first and second sections, respectively.

7. The apparatus of claim 2, wherein each of said first and second pistons has a peripheral surface and at least one piston ring recessed into said peripheral surface.

8. The apparatus of claim 2, wherein each of said first and second pistons has a plurality of split piston rings each having end portions adjacent one another, the end portions of the split rings of each of said first and second pistons being staggered relative to each other.

9. The apparatus of claim 2, wherein said housing includes two sections abutting each other in a predetermined plane between said opposed sides, said moving means further comprising a device for supplying a pressurized fluid to said first and second pistons, said device being disposed between said sections at said predetermined plane.

10. The apparatus of claim 9, wherein said device and said additional melt-conveying member are movable with reference to said sections independently of each other.

11. The apparatus of claim 9, wherein each of said discrete melt-conveying members has at least one passage for delivery of pressurized fluid to one of said first and second pistons and said device has at least one passage with discharge ends for delivery of pressurized fluid to the at least one passage of each discrete melt-conveying member.

12. The apparatus of claim 11, wherein each of said discrete melt-conveying members has a cylinder for said first and second pistons, respectively, and wherein said at least one passage of each discrete melt-conveying member communicates with one of said cylinders, respectively.

13. The apparatus of claim 12, wherein said device extends between said first and second pistons and includes a further passage for admission of pressurized fluid between said first and second pistons.

* * * * *